US009517758B2

(12) United States Patent
Shimada et al.

(10) Patent No.: US 9,517,758 B2
(45) Date of Patent: Dec. 13, 2016

(54) VEHICLE BRAKING DEVICE

(71) Applicant: HONDA MOTOR CO., LTD., Minato-Ku, Tokyo (JP)

(72) Inventors: Takashi Shimada, Wako (JP); Soichiro Ueura, Wako (JP); Kazuharu Kidera, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/521,896

(22) Filed: Oct. 23, 2014

(65) Prior Publication Data

US 2015/0115699 A1    Apr. 30, 2015

(30) Foreign Application Priority Data

Oct. 25, 2013   (JP) .................................. 2013-222393

(51) Int. Cl.
*B60T 8/40* (2006.01)
*B60T 13/66* (2006.01)
(Continued)

(52) U.S. Cl.
CPC ............... *B60T 13/66* (2013.01); *B60T 7/042* (2013.01); *B60T 13/146* (2013.01); *B60T 13/662* (2013.01); *B60T 13/745* (2013.01); *B60T 8/4081* (2013.01)

(58) Field of Classification Search
CPC ...... B60T 7/042; B60T 8/4081; B60T 13/146; B60T 13/662; B60T 13/745
(Continued)

(56) References Cited

U.S. PATENT DOCUMENTS 8,583,337 B2 * 11/2013 Matsushita ............. B60T 7/042
                                                    303/191
8,959,909 B2    2/2015 Nishioka et al.
(Continued)

FOREIGN PATENT DOCUMENTS

CN       103085792 A    5/2013
DE    102011089047 A1   6/2012
(Continued)

OTHER PUBLICATIONS

Office Action dated Sep. 8, 2015 in the corresponding Japanese Patent Application 2013-222393.
(Continued)

*Primary Examiner* — Thomas Irvin
(74) *Attorney, Agent, or Firm* — Carrier Blackman & Associates, P.C.; Joseph P. Carrier; Jingli Wang

(57) ABSTRACT

The vehicle braking device includes a hydraulic pressure generating device generating a primary hydraulic pressure corresponding to the braking operation by a driver, a motor cylinder device operating to cause the secondary hydraulic pressure generated by operation of the electric motor to track the target hydraulic pressure based on the control operation quantity, a brake pedal sensor detecting the braking operation quantity, a primary hydraulic pressure sensor, an ECU performing switching control in accordance with whether the braking operation quantity detected by the brake pedal sensor reaches a predetermined threshold value, between operating the motor cylinder device on the basis of the braking operation quantity and operating the motor cylinder device on the basis of a correlation value of the braking operation force detected by the motor cylinder device 16 or the correlation value and the braking operation quantity.

11 Claims, 7 Drawing Sheets

(51) Int. Cl.
B60T 7/04 (2006.01)
B60T 13/74 (2006.01)
B60T 13/14 (2006.01)

(58) Field of Classification Search
USPC .............. 303/3, 11, 113.4, 115.2, 115.4, 155
See application file for complete search history.

(56) References Cited

U.S. PATENT DOCUMENTS

| | | | |
|---|---|---|---|
| 2002/0153771 A1 | 10/2002 | Obuchi | |
| 2010/0089709 A1* | 4/2010 | Shimada | B60T 1/10 188/159 |
| 2011/0224881 A1* | 9/2011 | Matsushita | B60T 7/042 701/70 |
| 2012/0038208 A1* | 2/2012 | Matsushita | B60L 7/18 303/3 |
| 2012/0062023 A1* | 3/2012 | Ohkubo | B60T 7/042 303/3 |
| 2012/0151914 A1* | 6/2012 | Nishioka | B60T 7/042 60/545 |
| 2013/0106170 A1 | 5/2013 | Baek | |
| 2014/0008965 A1* | 1/2014 | Ito | B60T 8/4081 303/3 |
| 2015/0021981 A1* | 1/2015 | Shimada | B60T 13/146 303/121 |
| 2015/0061366 A1* | 3/2015 | Shimada | B60T 13/146 303/15 |
| 2015/0084401 A1* | 3/2015 | Shimada | B60T 8/36 303/15 |
| 2015/0097415 A1* | 4/2015 | Shimada | B60T 7/042 303/3 |
| 2015/0097416 A1* | 4/2015 | Ueura | B60T 7/042 303/3 |
| 2015/0298670 A1* | 10/2015 | Ullrich | B60T 8/442 303/155 |

FOREIGN PATENT DOCUMENTS

| | | | | |
|---|---|---|---|---|
| JP | 2008-110633 | * | 5/2008 | ............... B60T 8/17 |
| JP | 2009-227023 A | | 10/2009 | |
| JP | 2011-235896 A | | 11/2011 | |
| JP | 2012162238 A | | 8/2012 | |

OTHER PUBLICATIONS

Search Report of corresponding German Patent Application 10 2014 221 664.8 dated Jul. 9, 2015 with English translation.
Office Action issued Sep. 26, 2016 in corresponding Chinese Patent Application 201410573540.9 with English translation thereof.

* cited by examiner

Braking stroke quantity (braking operation quantity)

VEHICLE BRAKING DEVICE

TECHNICAL FIELD

The present invention relates to a vehicle braking device generating a braking force for the vehicle.

BACKGROUND ART

For example, in a hybrid vehicle, a By Wire type of braking device for generating braking forces through an electric system has been adopted in addition to a conventional braking device for generating braking forces through a hydraulic system. In the related braking device having a By Wire system, an operation quantity of the brake pedal by a driver is converted into an electric signal to apply the electric signal to an electric actuator for driving a piston of a slave cylinder (hereinafter referred to as "motor cylinder device").

Then, the piston driven by the operation of the electric actuator generates a hydraulic pressure in the motor cylinder. The hydraulic pressure generated as described above is applied to wheel cylinders to generate braking forces for the vehicle (for example, see JP2009-227023A).

In the by-wire type of braking device according to JP2009-227023A, to avoid to provide an operation feeling during depressing a brake pedal, for example, a stroke simulator is used for generating a reaction force characteristic in accordance with an operation quantity of brake paddle by a driver (brake stroke quantity) using a plurality of springs in combination.

According to the stroke simulator of the braking device disclosed in JP2009-227023A, the reaction force characteristic can be created in accordance with the operation quantity of the brake pedal by the driver.

In the stroke simulator of the braking device according to JP2009-227023A, it is desirable to set such a reaction force characteristic that, when the operation quantity of the brake pedal is small, a smaller reaction force is generated, and when the operation quantity of the brake pedal is larger, a larger reaction force is generated. Further, though the operation force of the braking pedal is extremely large, it is preferable to have a reaction force characteristic which does not give the driver such a used-up feeling that a remaining stroke of the brake pedal is used up.

However, to set the above-described reaction force characteristic the stroke simulator, it is required to have a precise mechanical structure in which a plurality of spring members having different spring constants are precisely assembled. Accordingly it is difficult to provide the above-described reaction force characteristic. Further, the request for downsizing the stroke simulator may be a factor hindering the reaction force characteristic from being realized. Accordingly, when the operation force of the brake pedal has a certain magnitude, such a case may occur that the brake pedal comes in a used-up status in which the remaining stroke of the brake pedal is used up. In such a case, for example, if a target hydraulic pressure is calculated on the basis of the operation quantity of the brake pedal, a hydraulic pressure becoming a maximum value may be set when the operation force of the brake pedal has a certain magnitude.

In such a case, a maximum hydraulic pressure is frequently set as the target. Accordingly, there will be frequent chances of the braking device becoming fully operating by performing the braking ability to an upper limit. As a result, the braking device may become an overheat state as well as durability of the components of the braking device may be decreased.

SUMMARY OF INVENTION

The present invention has been made in consideration of the above-described circumferences, and aims to enhance the durability of the components of the braking device.

A first aspect of the present invention provides a vehicle braking device, comprising:

a primary hydraulic pressure generating unit configured to generate a primary hydraulic pressure in accordance with a braking operation by a driver;

a secondary hydraulic pressure generating unit configured to operate so that the secondary hydraulic pressure generated by the operation of an electric actuator tracks a target hydraulic pressure based on the braking operation;

a braking operation quantity detecting unit configured to detect a quantity of the braking operation;

a braking operation force detecting unit configured to detect a correlation value of a force of the braking operation; and a control unit configured to calculate the target hydraulic pressure and to perform switching control, in accordance with whether the quantity of the braking operation detected by the braking operation quantity detecting unit is smaller than a predetermined threshold value or not, between causing the secondary hydraulic pressure generating unit to operate on the basis of the quantity of the braking operation and causing the secondary hydraulic pressure generating unit to operate on the basis of the correlation value of the control operation force or the correlation value of the control operation force and the quantity of the braking operation.

As the correlation value of the force of the braking operation, a detection value of the load sensor for detecting a load of depression of the brake pedal may be adopted in addition to the primary hydraulic pressured detected by the braking operation force detecting unit.

According to the first aspect of invention, the switching control is made in accordance with whether the quantity of the braking operation detected by the braking operation force is smaller than a predetermined threshold value between causing the secondary hydraulic pressure generating unit to operate on the basis of the quantity of the braking operation and causing the secondary hydraulic pressure generating unit to operate on the basis of the correlation value of the control operation force detected by the braking operation force detecting unit or the correlation value and the quantity of the braking operation. Accordingly, this suppresses an overheat status of the braking device, which enhances a durability of the components of the braking device.

A second aspect of the present invention provides the vehicle braking device recited in the first aspect in which the control unit performs control to operate the secondary hydraulic pressure generating unit on the basis of a quantity of braking operation when the quantity of the braking operation is smaller than the predetermined threshold. On the other hand, when the quantity of the braking operation is equal to or larger than the predetermined threshold value, the control unit performs control to operate the secondary hydraulic pressure generating unit on the basis of the correlation value of the control operation force detected by the braking operation force detecting unit or the correlation value and the quantity of the braking operation.

In a first region where the braking operation quantity is smaller than the threshold value, there is no obstacle in calculating the target hydraulic pressure on the basis of the braking operation quantity. This is because in the first region, a variation in the braking operation quantity appropriately occurs. Then the control unit calculates the target hydraulic pressure on the basis of the braking operation quantity and operates the secondary hydraulic pressure generating unit so that the secondary hydraulic pressure to tracks the target hydraulic pressure calculated as described above.

On the other hand, in the second region where the braking operation quantity has reached the threshold value, there is a difficulty in calculating a proper target hydraulic pressure on the basis of the braking operation quantity. This is because in the second region, there is substantially no variation of the braking operation quantity. Accordingly, the control unit calculates the target hydraulic pressure on the basis of the correlation value of the braking operation force such as the primary hydraulic pressure or the correlation value and the braking operation quantity. The control unit operates the secondary hydraulic pressure generating unit so that the secondary hydraulic pressure tracks the target hydraulic pressure calculated as described above.

According to the second aspect of the present invention, in the first region, the control unit calculates the target hydraulic pressure on the basis of the braking operation quantity, and operates the secondary hydraulic pressure generating unit on the basis of the correlation value of the braking operation force such as the primary hydraulic pressure so that the secondary hydraulic pressure tracks the target hydraulic pressure. On the other hand, in the second region, the control unit calculates the target hydraulic pressure on the basis of the corresponding correlation value of the braking operation force such as the primary hydraulic pressure or the corresponding correlation value and the braking operation quantity so that the secondary hydraulic pressure tracks the target hydraulic pressure calculated as described above. Accordingly, there is no chance that the target hydraulic pressure becomes a maximum status regardless of how long the driver applies an extremely large braking operation force.

Accordingly, like the first aspect of the present invention, the second aspect of the present invention suppresses chances in which the brake device enters an overheat status as well as enhances the durability of the components of the brake device.

Further, a third aspect of the present invention provides the vehicle braking device according to the first or second aspect of the present invention, in which, the control unit performs the switching control from causing the secondary hydraulic pressure generating unit to operate on the basis of the quantity of the braking operation to causing the secondary hydraulic pressure generating unit to operate on the basis of the correlation value of the control operation force or causing the secondary hydraulic pressure generating unit to operate on the basis of the correlation value of the control operation force and the quantity of the braking operation, gradually.

According to the third aspect of the present invention, when the control unit performs the switching control from causing the secondary hydraulic pressure generating unit to operate on the basis of the quantity of the braking operation to causing the secondary hydraulic pressure generating unit to operate on the basis of the correlation value and the quantity of the braking operation, the switching control is gradually performed. Accordingly, an unnatural feeling when the switching control is made can be moderated.

Advantageous Effect of Invention

According to the vehicle brake device of the present invention, it is prevented for the braking device from entering the overheat status as well as the durability of the components of the brake device can be enhanced.

MODES FOR CARRYING OUT INVENTION

Figure 1:
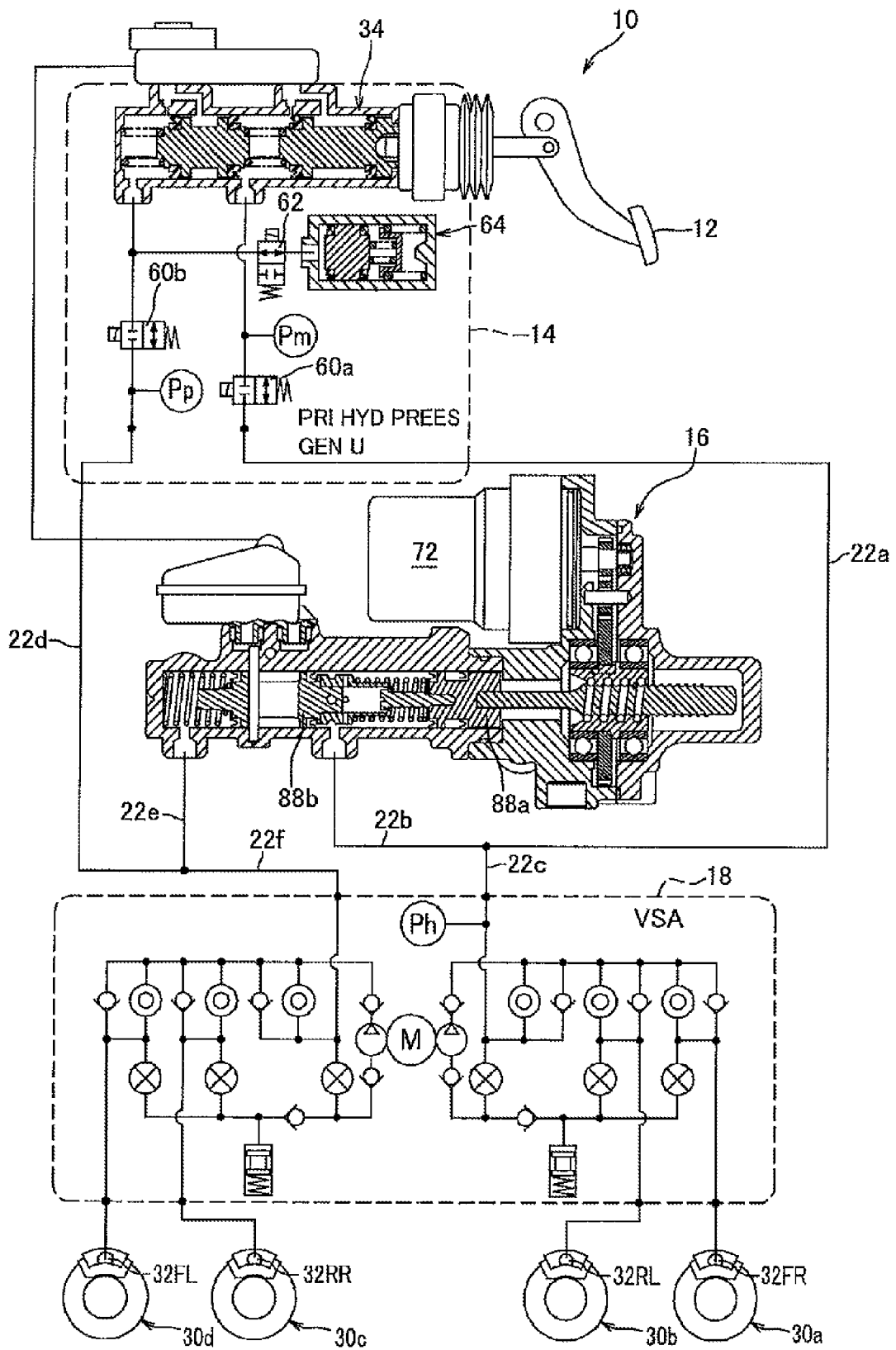
FIG. 1 is a block diagram generally showing a vehicle brake device according to the embodiments of the present invention.

Hereinafter embodiments of the present invention will be described in detail with reference to the drawings.

In the drawings referred below, the same reference is designated for the members with the same or corresponding function.

Further, in the drawings sizes and shapes of members may be changed to show the member schematically.

[General Structure of a Vehicle Braking Device 10 According to the Embodiments of the Present Invention]

First, a general structure of the vehicle braking device 10 according to the embodiment of the present invention will be described with reference to FIG. 1. FIG. 1 is a block diagram showing a general structure of the vehicle braking device 10 according to the embodiments of the present invention.

The vehicle braking device 10 according to the embodiment of the present invention includes a braking device having a brake-by-wire (ByWire) system for generating a braking force through an electric system in addition to a conventional type of braking device for generating a braking force through a hydraulic system.

The vehicle braking device 10 has a configuration including, as shown in FIG. 1, a hydraulic pressure generating device 14, (which corresponds to "a primary hydraulic pressure generating unit") for generating a primary hydraulic pressure in accordance with a braking operation by the driver through a brake pedal 12, a motor cylinder device for generating a secondary hydraulic pressure based on at least an electric signal according to the braking operation by the driver, (which corresponds to "a secondary hydraulic pressure generating unit"), and a vehicle stability assist device 18 (hereinafter referred to as VSA device 18 ("VSA" is a trade mark)) for assisting for stabilizing a behavior of the vehicle (not shown) on the basis of the secondary hydraulic pressure generated by a motor cylinder device 16, and disk braking devices 30a to 30d, etc.

The hydraulic pressure generating device 14 includes a master cylinder device 34 for converting the braking operation by the driver inputted through the brake pedal 12, a stroke simulator 64 generating a pseudo-reaction force for the brake pedal 12, and a first cut-off valve 60a, a second cut-off valve 60b, and a third cut-off valve 60c, etc. The motor cylinder device 16 includes a first slave piston 88a and a second slave piston 88b (which corresponds to electric actuators according to the present invention) which generate secondary hydraulic pressures in response to rotational drive force by electric motor 72.

Piping tubes out of piping tubes 22 on an upstream side of the first cut-off valve 60a are provided with a primary hydraulic pressure sensor Pm. The primary hydraulic pressure sensor Pm has a function for detecting a primary hydraulic pressure generated by the master cylinder device 34 by the braking operation by the driver. Further, piping tubes 22d out of the piping tubes 22d on a side of downstream of the second cut-off valve 60b and piping tubes 22c are provided with secondary hydraulic pressure sensors Pp, Ph, respectively. The secondary hydraulic pressure sensors Pp, Ph have functions for detecting secondary hydraulic pressures generated by the operations of the motor cylinder device 16 and the vehicle stability assist device 18.

Figure 2:
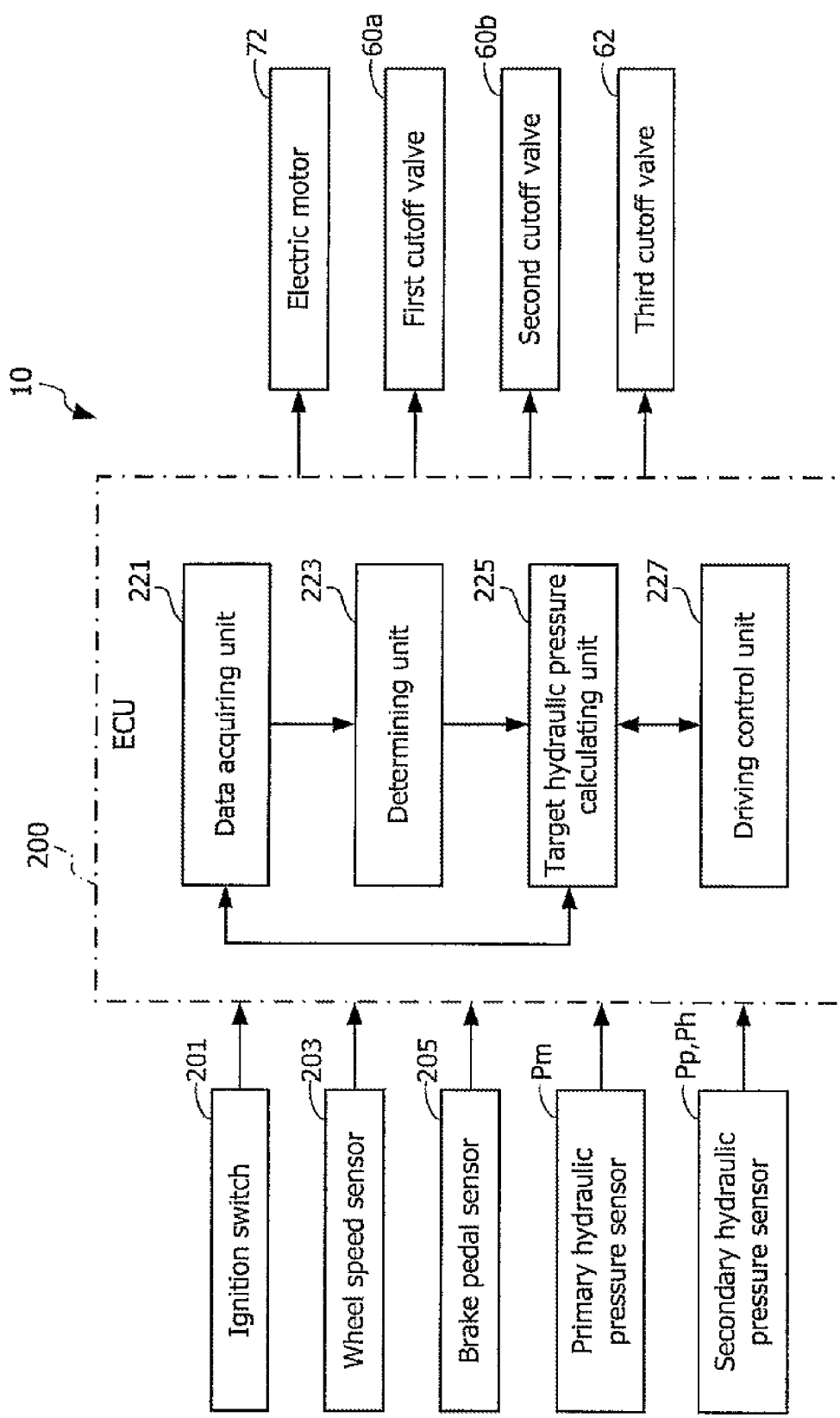
FIG. 2 is a block diagram showing an ECU and a peripheral configuration of the ECU included in the vehicle brake device according to the embodiments of the present invention.

Explanation of other elements shown in FIG. 2 is omitted because there is no direct relation to this invention.

[Basic Operation of the Vehicle Braking Device 10 According to the Embodiment of the Present Invention]

Next, a basic operation of the vehicle braking device 10 will be described.

In the vehicle braking device 10, in a normal operating status in which an ECU 200 performs an integrated control for the vehicle braking device 10 including the motor cylinder device 16, when the driver performs a braking operation by depressing the brake pedal 12, the braking device of the brake-by-wire system becomes active.

More specifically, in the vehicle braking device 10 being in the normal operating status, when the driver performs the braking operation, the first cut-off valve 60a and the second cut-off valve 60b are closed and on the other hand, a third cut-off valve 62 is opened. The primary hydraulic pressure generated in the master cylinder device 34 is applied from the master cylinder device 34 to the stroke simulator 64. As a result, though the first cut-off valve 60a and the second cut-off valve 60b are being closed, buffering the primary hydraulic pressure occurs, so that a stroke of the brake pedal 12 is created.

More specifically, in the vehicle braking device 10, the primary hydraulic pressure generated by the master cylinder device 34 is supplied to the stroke simulator 64 and is not used for braking.

In the normal operating status of the vehicle braking device 10, under a status in which communication is closed between the master cylinder device 34 and the disk braking devices 30a to 30d (a wheel cylinders 32FR, 32RL, 32RR, 32F1), the secondary hydraulic pressure is generated by the motor cylinder device 16 in accordance with the braking operation by the driver, and the disk braking devices 30a to 30d are caused to operate using the secondary hydraulic pressure generated as described above.

On the other hand, in the vehicle braking device 10, in an abnormal status in which the motor cylinder device 16 and the ECU 200 do not normally operate, when the driver performs a braking operation, the conventional hydraulic type braking device becomes active.

More specifically, in the abnormal status of the vehicle braking device 10, when the driver performs the braking operation, the first cut-off valve 60a and the second cut-off valve 60b are opened, and the third cut-off valve 62 is closed. The primary hydraulic pressure generated by the master cylinder device 34 is transmitted to the disk braking devices 30a to 30d (the wheel cylinders 32FR, 32RL, 32RR, 32FL) through necessary piping tubes 22a to 22f, which operates the disk braking devices 30a to 30d (the wheel cylinders 32FR, 32RL, 32RR, 32FL).

More specifically, in the abnormal status of the vehicle braking device 10, the primary hydraulic pressure generated by the master cylinder device 34 is not supplied to the stroke simulator 64, but used for braking as it is, which is different from the normal operation. [Peripheral structure of the ECU 200 included by the vehicle braking device 10 according to the embodiment of the present invention]

A peripheral structure of the ECU 200 included by the vehicle braking device 10 according to the embodiment of the present invention will be described. FIG. 2 is an illustration showing the peripheral structure of the ECU 200 included in the vehicle braking device 10 according to the embodiment of the present invention.

As shown in FIG. 2, an ignition switch 201 (hereinafter referred to as "IG key switch), a wheel speed sensor 203, a brake pedal sensor 205, the primary hydraulic pressure sensor Pm, and the secondary hydraulic pressure sensors Pp, Ph are connected to the ECU 200. The ECU 200 corresponds to "control unit" of the present invention.

The ignition switch 201 is a switch operated to supply an electric power from an in-vehicle battery (not shown) to respective parts of the vehicle. When the ignition switch 201 is turned on, the ECU 200 is supplied with the electric power, which starts up the ECU 200.

The wheel speed sensors 203 have functions for detecting rotation speeds of the respective wheels (wheel speed). The wheel speed signals of the wheel speed sensors 203 detected by the respective wheels are sent to the ECU 200.

The brake pedal sensor 205 has a function for detecting an operation quantity (braking stroke quantity) of the brake pedal 12 by the driver. The operation quantity (braking stroke quantity) of the brake pedal 12 detected by the brake pedal sensor 205 is sent to the ECU 200.

The signal of the primary hydraulic pressure detected by the primary hydraulic pressure sensor Pm is sent to the ECU 200. Further, the signals of the secondary hydraulic pressures detected by the secondary hydraulic pressure sensors Pp, Ph are sent to the ECU 200.

On the other hand, the ECU 200 is, as shown in FIG. 2, connected to the electric motor 72, the first to third cut-off valves 60a, 60b, 62 as an output system.

The ECU 200 includes a data acquiring unit 221, a determining unit 223, a target hydraulic pressure calculating unit 225, and a driving control unit 227.

The ECU 200 includes a microcomputer including a CPU (Central Processing Unit), a ROM (Read Only Memory), and a RAM (Random Access Memory). The microcomputer operates to read out a program and data stored in the ROM, executes the program to perform operation controls of respective functions of the ECU 200 including the data acquiring function, a determining function for determining whether the brake operating quantity is smaller than a predetermined threshold value, a calculating function for calculating the secondary hydraulic pressure to be a target, and a hydraulic pressure control function.

The data acquiring unit 221 has a function of acquiring data of wheel speed data from the wheel speed sensor 203, data of the operation quantity (brake stroke quantity) of the brake pedal 12 detected by the brake pedal sensor 205, data of the primary hydraulic pressure detected by the primary hydraulic pressure sensor Pm, and data of the secondary hydraulic pressure detected by the secondary hydraulic pressure sensors Pp, Ph. Various types of the data acquired by the data acquiring unit 221 are sent to the determining unit 223 and the target hydraulic pressure calculating unit 225.

The determining unit 223 has a function of determining whether the operation quantity (braking operation quantity) of the brake pedal 12 out of the data of various types of information sent from the data acquiring unit 221 is smaller than a predetermined threshold value. The predetermined threshold value will be described in detail later. A determining result of the determining unit 223 is sent to the target hydraulic pressure calculating unit 225.

The target hydraulic pressure calculating unit 225 has a function of calculating the secondary hydraulic pressure as a target on the basis of the data of the operation quantity (braking operation quantity) of the brake pedal 12, the data of the primary hydraulic pressure detected by the primary hydraulic pressure sensor Pm, the determining result of the determining unit 223, etc. An internal structure of the target hydraulic pressure calculating unit 225 will be described in detail later.

The driving control unit 227 has a function of performing operation control of an operation quantity and an operation speed of the electric motor 72 to cause the secondary hydraulic pressure by the motor cylinder device 16 so as to track a target hydraulic pressure calculated by the target hydraulic pressure calculating unit 225. Further, the driving control unit 227 has a function of performing an operation control for opening and closing the first to third cut-off valves 60a, 60b, 62.

[Block Structure Showing a Configuration of the Target Hydraulic Pressure Calculating Unit 225 Included by the ECU 200]

Figure 3:
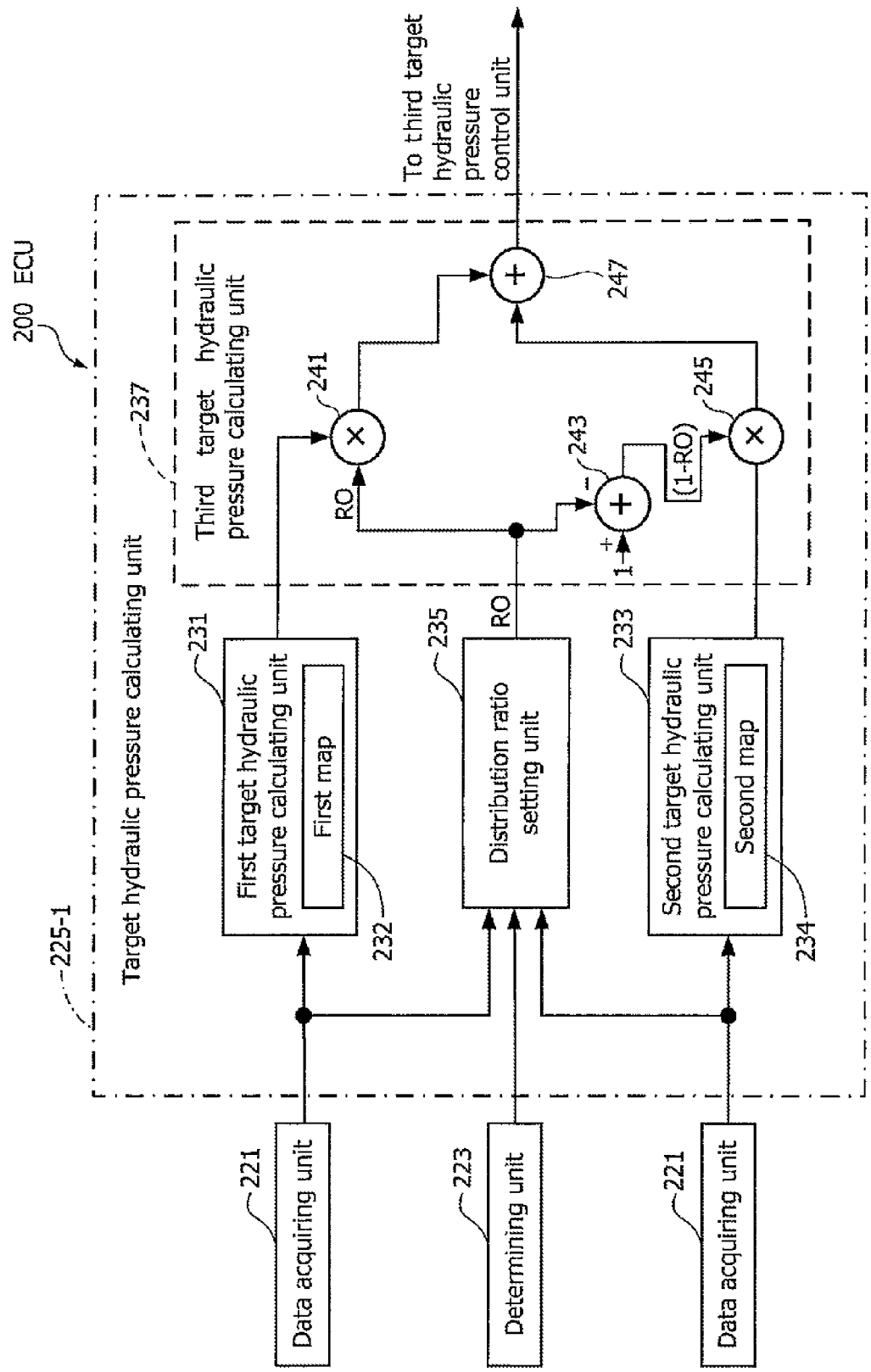
FIG. 3 is a block diagram showing a configuration of the target hydraulic pressure calculating unit according to a first embodiment.
Figure 4:
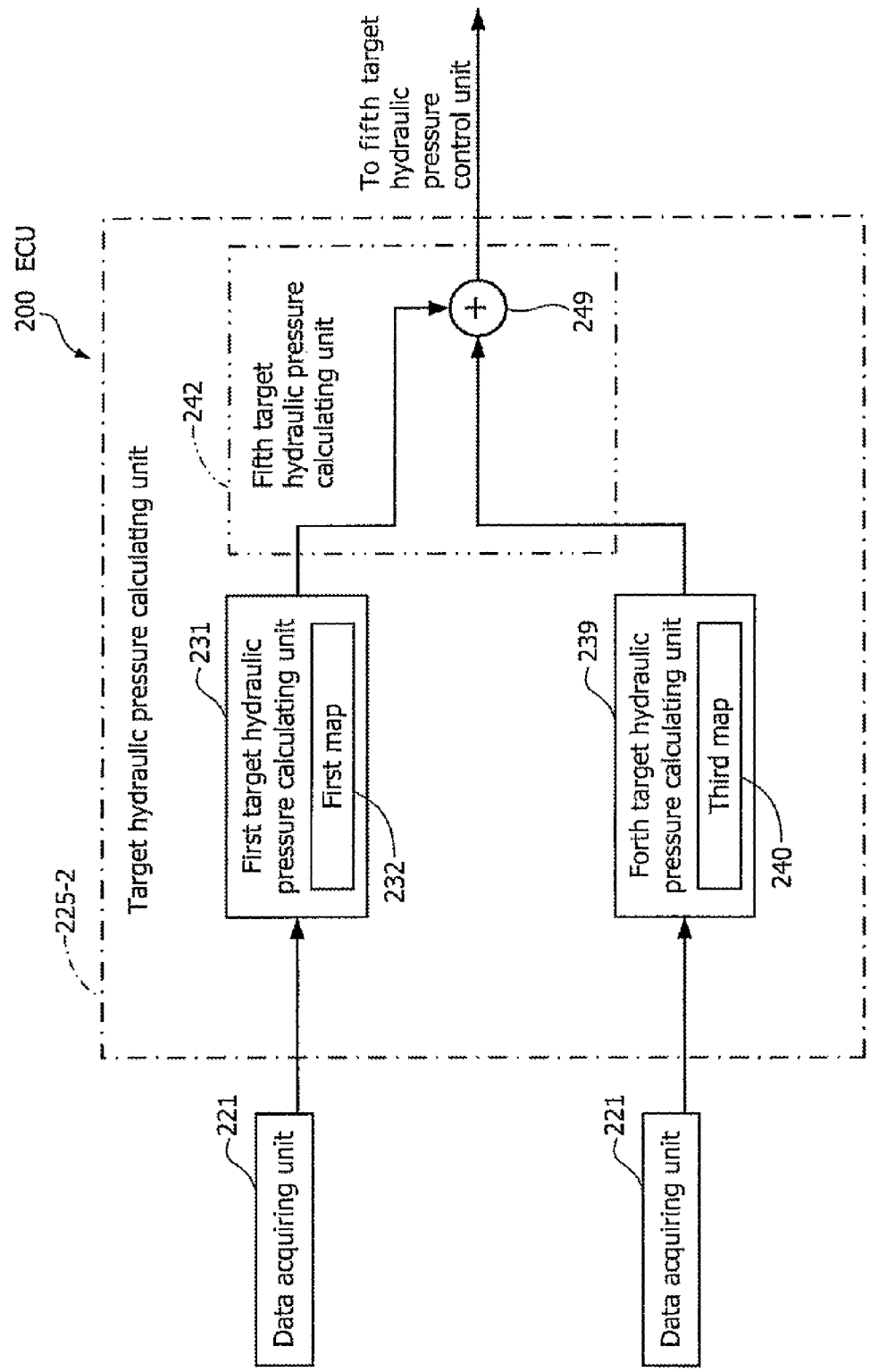
FIG. 4 is a block diagram showing a configuration of a target hydraulic pressure calculating unit according to a second embodiment.

Next, a block structure showing a configuration of the target hydraulic pressure calculating unit 225 included by the ECU 200 will be described with reference to FIGS. 3 and 4. FIG. 3 is a block diagram showing the configuration of a target hydraulic pressure calculating unit 225-1 according to the first embodiment. FIG. 4 is a block diagram showing a configuration of a target hydraulic pressure calculating unit 225-2 according to a second embodiment.

The target hydraulic pressure calculating units 225-1, 225-2 are referred to as "the target hydraulic pressure calculating unit 225", when generally referred.

(Target Hydraulic Pressure Calculating Unit 225-1 According to the First Embodiment)

The target hydraulic pressure calculating unit 225-1 according to the first embodiment includes a first target hydraulic pressure calculating unit 231, a second target hydraulic pressure calculating unit 233, a distribution ratio setting unit 235, and a third target hydraulic pressure calculating unit 237.

The first target hydraulic pressure calculating unit 231 has, as shown in FIG. 3, a function of calculating a first target hydraulic pressure, as a target hydraulic pressure according to the braking operation quantity with reference a first map 232 storing the braking operation quantity and the target hydraulic pressure according to variation of the an operation quantity (braking operation quantity) of the brake pedal 12 with correspondence therebetween. A characteristic of the first target hydraulic pressure previously stored in the first map 232 has no specific limitation, but such a characteristic may be appropriately adopted that, for example, the first target hydraulic pressure increases with increase in the braking operation quantity.

The second target hydraulic pressure calculating unit 233 has a function of calculating the second target hydraulic pressure as a target hydraulic pressure according to the braking operation force with reference to a second map 234 storing the primary hydraulic pressure (correlation value of the braking operation force) and a target hydraulic pressure according to a variation of the primary hydraulic pressure with correspondence each other. A characteristic of the second target hydraulic pressure previously stored in the second map 234 is not specifically limited. For example, it is enough to adopt such a characteristic that the second target hydraulic pressure increases with increase in the braking operation force.

The distribution ratio setting unit 235 has a function of setting a distribution ratio RO of weighting in which the first target hydraulic pressure and the second target hydraulic pressure participate a third target hydraulic pressure with reference to the determining result of the determining unit 223 as to whether the braking operation quantity is smaller than the predetermined threshold value when the distribution ratio setting unit 235 calculates the third target hydraulic pressure, which is a target hydraulic pressure finally adopted.

At this point, though the predetermined threshold value relating to the braking operation quantity is not specifically limited. However, for example, the braking operation quantity from time before (for example, just before) the brake pedal 12 becomes in the used-up status (or when the brake operating member of the vehicle approaches an end of a complete stroke thereof) to time when the brake pedal 12 becomes substantially in the used-up status may be appropriately set.

Figure 8:
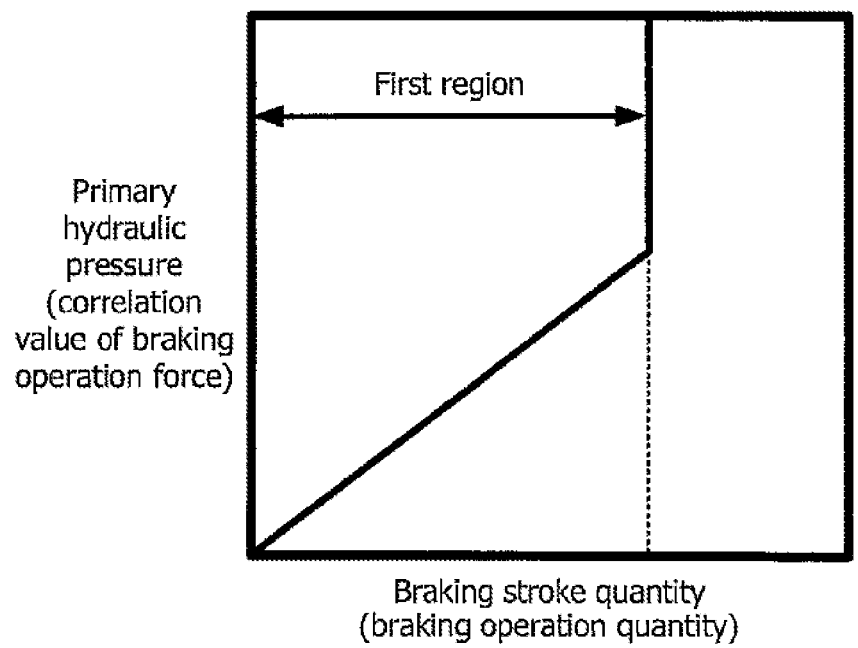
FIG. 8 is a chart showing a variation characteristic in the target hydraulic pressure with respect to a braking operation quantity and a braking operation force for explanation an operation of the vehicle brake device of another comparative example.

Further, "time when the brake pedal 12 becomes substantially in the used-up status" is time when the primary hydraulic pressure (correlation value of the braking operation force) continues to increase by continuous braking operation by a further greater force though the driver feels the used-up feeling of the brake pedal 12 (see a characteristic curve rising substantially vertical in FIG. 8).

Herein below, it is assumed that as the threshold value of the braking operation quantity, the present invention uses the braking operation quantity at the time when the brake pedal 12 becomes substantially in the used-up status or when the brake operating member of the vehicle approaches an end of a complete stroke thereof.

More specifically, the distribution ratio setting unit 235 sets, in a first region (see FIG. 5) in which the braking operation quantity is smaller than the threshold value, such a value of the distribution ratio RO that a value of the third target hydraulic pressure is equalized to a value of the first target hydraulic pressure. On the other hand, the distribution ratio setting unit 235 sets, in a second region (see FIG. 5) in which the braking operation quantity reaches to and above the threshold value, such a value of the distribution ratio RO that a value of the third target hydraulic pressure is equalized to a value of the second target hydraulic pressure.

However, the distribution ratio setting unit 235 may be configured to set the distribution ratio RO to such a value that the third target value is equalized to a target hydraulic pressure calculated with reference to both the first target hydraulic pressure based on the braking operation quantity and the second target hydraulic pressure based on the braking operation force.

The third target hydraulic pressure calculating unit 237 has a function of calculating the third target hydraulic pressure on the basis of the distribution ratio RO of weighting set by the distribution ratio setting unit 235, the first target hydraulic pressure based on the braking operation quantity and the second target hydraulic pressure based on the braking operation force.

More specifically, the third target hydraulic pressure calculating unit 237 includes a first multiplier 241, a subtracter 243, a second multiplier 245, and an adder 247. The first multiplier 241 multiplies the first target hydraulic pressure based on the braking operation quantity by the distribution ratio RO of weighting set by the distribution ratio setting unit 235 to output the result. The subtracter 243 subtracts the distribution ratio RO of weighting from a constant of "1" (RO being equal to or greater than "0" and equal to or smaller than "1") to output the result. The second multiplier 245 multiplies the second target hydraulic pressure based on the braking operation force by the distribution ratio (1-RO) outputted by the subtracter 243 to output the result. The adder 247 adds the output of the first multiplier 241 and the output of the second multiplier 245 to output the third target hydraulic pressure.

(Target Hydraulic Pressure Calculating Unit 225-2 According to a Second Embodiment]

The target hydraulic pressure calculating unit 225-2 according to a second embodiment includes, as shown in FIG. 4, the first target hydraulic pressure calculating unit 231 common to that in the first embodiment, a fourth target hydraulic pressure calculating unit 239, and a target hydraulic pressure calculating unit 242.

The fourth target hydraulic pressure calculating unit 239 has a function of calculating an additional value to the first target hydraulic pressure based on the braking operation force with reference to a third map 240 storing the additional values to the first target hydraulic pressure in accordance with a variation of the primary hydraulic pressure (correlation value of the braking operation force) with correspondence to the primary hydraulic pressure. A characteristic of the additional values to the first hydraulic pressure previously stored in the third map 240 is not specifically limited, but for example. It is enough to adopt such a characteristic that the additional value increases with an increase in the braking operation force, etc.

The fifth target hydraulic pressure calculating unit 242 has a function of calculating the fifth target hydraulic pressure finally adopted on the basis of the first target hydraulic pressure based on the braking operation quantity and the additional value for the first target hydraulic pressure according to the braking operation force.

More specifically, the fifth target hydraulic pressure calculating unit 242 has a configuration including an adder 249. The adder 249 adds the first target hydraulic pressure based on the braking operation quantity and the additional value to the first target value according to the braking operation force to output the result as the fifth target hydraulic pressure.

[Operation of the Vehicle Braking Device 10 According to the Embodiment of the Present Invention]

Figure 5:
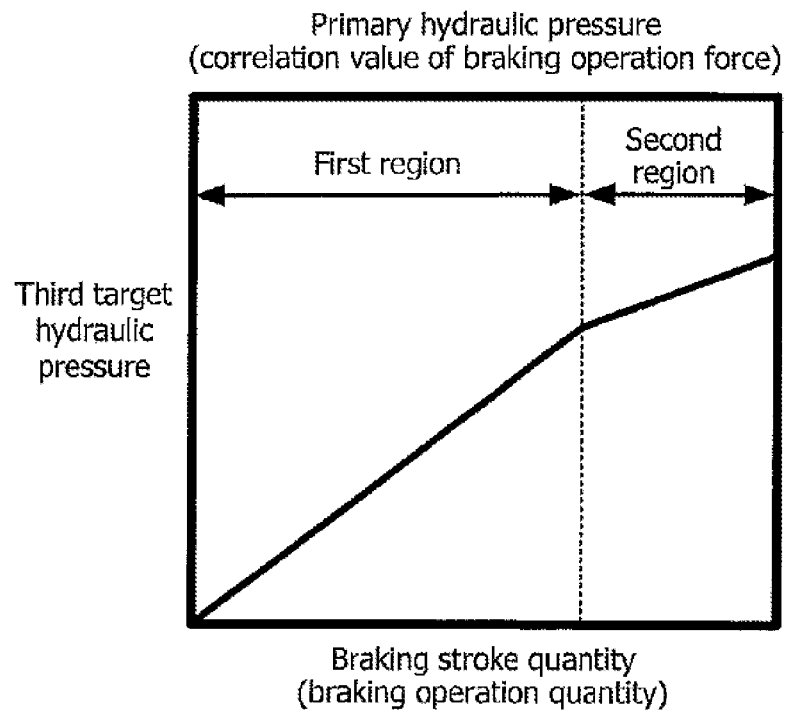
FIG. 5 is a chart showing a variation characteristic in the target hydraulic pressure with respect to a braking operation quantity and a braking operation force for explaining an operation of the vehicle brake device at a distributing ratio according to the embodiments of the present invention.
Figure 6:
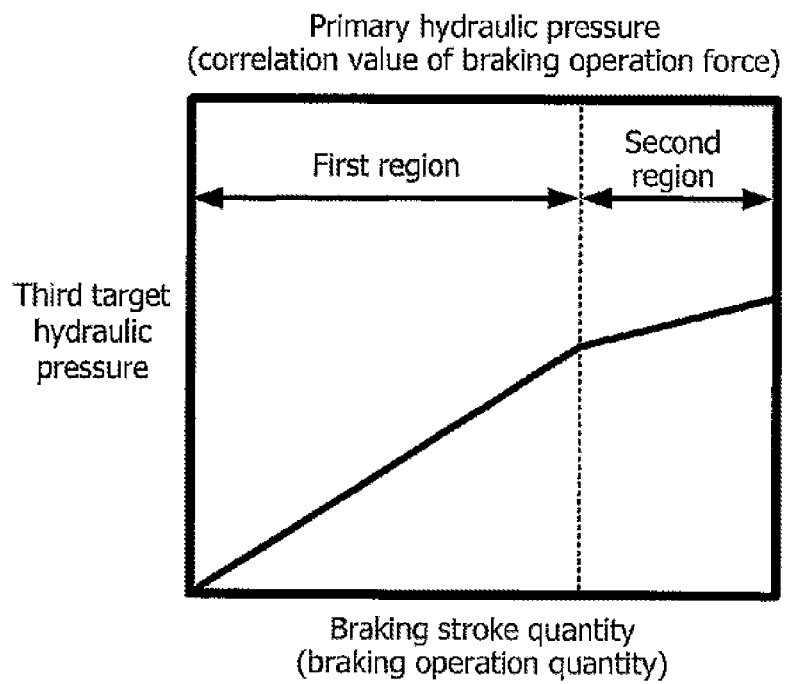
FIG. 6 is a chart showing a variation characteristic in the target hydraulic pressure with respect to a braking operation quantity and a braking operation force for explaining an operation of the vehicle brake device at another distributing ratio according to the embodiments of the present invention.

Next, an operation of the vehicle braking device 10 according to the embodiment of the present invention will be described with exemplification of the target hydraulic pressure calculating unit 225-1 according to the first embodiment (see FIG. 3) with reference to FIGS. 5 and 6. FIGS. 5 and 6 are charts showing variation characteristics of the target hydraulic pressure with respect to the braking operation quantity and the braking operation force for illustrating the operation of the vehicle braking device 10 according to the embodiments of the present invention.

First, an operation will be explained with an example in which in the first region (see FIG. 5), "1" is set to the distribution ratio RO, and in the second region (see FIG. 5), "0" is set to the distribution ratio RO in the distribution ratio setting unit 235 of the target hydraulic pressure calculating unit 225-1.

In the first region (see FIG. 5), the third target hydraulic pressure calculating unit 237 calculates the third target hydraulic pressure on the basis of a setting unit distribution ratio RO of "1" set in the distribution ratio setting unit 235, the first target hydraulic pressure based on the braking operation quantity, and the second target hydraulic pressure based on the braking operation force. In this case, the first target hydraulic pressure based on the braking operation quantity is adopted as the third target hydraulic pressure as it is.

Further, in the second region (see FIG. 5), the third target hydraulic pressure calculating unit 237 calculates the third target on the basis of the setting unit distribution ratio RO of "0" set in the distribution ratio setting unit 235, the second target hydraulic pressure on the basis of the first target hydraulic pressure based on the braking operation quantity and the braking operation force. In this case, the second target hydraulic pressure based on the braking operation force is adopted as the third target hydraulic pressure as it is.

Next, in the distribution ratio setting unit 235 of the target hydraulic pressure calculating unit 225-1 shown in FIG. 3, operation will be described with an example in which, in the first region (see FIG. 6), "0.8" is set to the weight distribution ratio RO, and on the other hand, in the second region (see FIG. 6), "0.2" is set to the distribution ratio RO.

In the first region (see FIG. 6) in the above-described case, the third target hydraulic pressure calculating unit 237 calculates the third target hydraulic pressure on the basis of the distribution ratio RO of "0.8" set by the distribution ratio setting unit 235, the first target hydraulic pressure based on the braking operation quantity, and the second target hydraulic pressure based on the braking operation force. In this case, the first target hydraulic pressure based on the braking operation quantity is multiplied by the distribution ratio RO of "0.8". On the other hand, the second target hydraulic pressure based on the braking operation force is multiplied by the distribution ratio RO of "0.2" to provide the additional value of the respective target hydraulic pressures which is adopted as the third target hydraulic pressure.

In summary, in the first region (see FIG. 6) where the braking operation quantity is smaller than the threshold value which is set to a value of the braking operation quantity at time when the brake pedal 12 enters the used-up status, a target hydraulic pressure of which weighting of the first target hydraulic pressure based on the braking operation quantity is made greater is adopted as the third target hydraulic pressure.

Next, in the second region (see FIG. 6) in the above-described case, the third target hydraulic pressure calculating unit 237 calculates the third target hydraulic pressure on the basis of the first target hydraulic pressure based on the weighting distribution ratio RO of "0.2" set by the distribution ratio setting unit 235, the first hydraulic pressure based on the braking operation quantity, and the second target hydraulic pressure based on the braking operation force. In this case, the first target hydraulic pressure based on the braking operation quantity is multiplied by the weighting distribution ratio RO of "0.2". On the other hand, the second target hydraulic pressure based on the braking operation force is multiplied by the weighting distribution ratio RO of "0.8". A value of an additional value of the respective target hydraulic pressures is adopted as the third target hydraulic pressure.

In summary, in the second region (see FIG. 6) where the braking operation quantity reaches the threshold value which is a braking operation quantity at time when the brake pedal 12 enters a substantially used-up state, a target hydraulic pressure of which weighting of the second target hydraulic pressure based on the braking operation force is made greater than the first target hydraulic pressure based on the braking operation quantity is adopted as the third target hydraulic pressure.

[Operation and Effect of the Vehicle Braking Device 10 According to Embodiments of the Present Invention]

Figure 7:
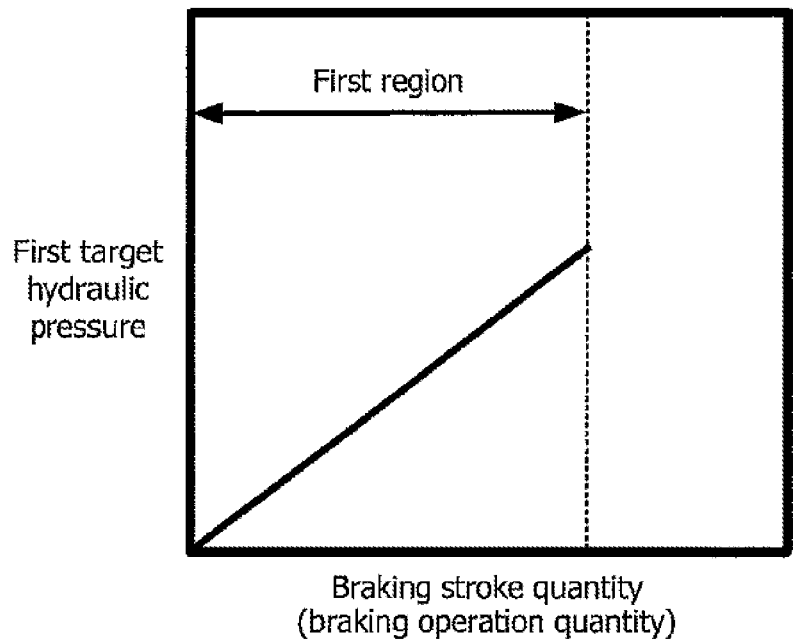
FIG. 7 is a chart showing a variation characteristic in the target hydraulic pressure with respect to a braking operation quantity and a braking operation force for explaining an operation of the vehicle brake device of a comparative example.

Next, operation and effect of the vehicle braking device 10 according to the embodiment of the present invention will be described with reference to FIGS. 7 and 8 with comparison with the operation of a vehicle brake device (not shown) according to a comparative example that the inventor considered. FIG. 7 is a chart showing a variation characteristic of the target hydraulic pressure with respect to the braking operation quantity to provide the operation explanation of the vehicle brake device according to the comparative example. FIG. 8 is a chart of variation characteristic for operation explanation of the vehicle brake device of the comparative example.

First, a configuration of the vehicle brake device of the comparative example is defined. The vehicle brake device of the comparative device is of the brake-by-wire type like the vehicle braking device 10 according to the embodiment of the present invention. The target hydraulic pressure calculating unit of the comparative example has a function of calculating the target hydraulic pressure which is a target hydraulic pressure according to the braking operation quantity with reference to a map (for example, see FIG. 7) stored with association with the target hydraulic pressure according to the variation of the operation quantity (braking operation quantity) of the brake pedal 12. The first region in the comparative example shown in FIG. 7 is the same as the first region according to the embodiment of the present invention.

However, in the comparative example, there is a difference in that a part corresponding to the second region where the braking operation quantity reaches the threshold value does not substantially exist. In other words, the vehicle brake device of the comparative example is different from the vehicle brake device of the embodiment of the present invention in that a characteristic in which the primary hydraulic pressure (correlation value of the braking operation force) rises substantially vertically in accordance with the braking operation force by the driver along the braking operation quantity curve (see dotted line in FIG. 7) at time when the brake pedal 12 enters the used-up status.

In the vehicle brake device of the comparative example, after the brake pedal 12 entered the used-up status, if the braking operation force is further added, there is almost no variation in the brake stroke quantity (braking operation quantity). Accordingly, in the vehicle brake device of the comparative example, after the brake pedal 12 entered the used-up status, an appropriate calculation of the target hydraulic pressure cannot be performed. In such a case, the calculation of the target hydraulic pressure based on the braking operation quantity is preformed before the brake pedal 12 enters the used-up status. Accordingly, it is required to provide setting of a map having such characteristic that the hydraulic pressure when the brake pedal 12 substantially enters the used-up status is equalized to the maximum target hydraulic pressure.

On the other hand, it is preferable to set a reaction force characteristic of the operation quantity (braking operation quantity) of the brake pedal 12 to create a reaction force which is large when the operation quantity of the brake pedal 12 is large. Though the operation force (braking operation force) of the brake pedal 12 is very large, it is preferable that a reaction force characteristic which does not provide a feeling of the used-up status in which there is no remaining stroke of the brake pedal 12.

However, to set the above-described reaction force characteristic for the stroke simulator 64, it is difficult to realize the reaction force characteristic because the precise configuration is required in which a plurality of spring members having different spring constants are combined.

Further, a request of down-sizing the stroke simulator may become a factor preventing the reaction force characteristic from being realized. Accordingly, actually, there may be a case where the brake pedal 12 may enter the used-up status. In that case, for example, if the target hydraulic pressure is calculated on the basis of the brake operating quantity, a maximum target hydraulic pressure is set when the braking operation force has a magnitude to some extent.

In such a case, a frequency in which the maximum target hydraulic pressure is set to a target hydraulic pressure becomes high, so that chances of the brake device fully operating by which the brake device performs the braking power up to an upper limit increases. As a result, the braking device enters an overheat status and there is a possibility of losing a durability of the components in the braking device.

Accordingly, in the vehicle braking device 10 based on the first aspect, the following configuration is adopted. The ECU 200 (control unit) performs switching control in which, in accordance with whether the quantity of the braking operation detected by the brake pedal sensor 205 (braking operation quantity detecting unit) is smaller than the predetermined threshold value or not, of operating the motor cylinder device (secondary hydraulic pressure generating unit) 16 or the motor cylinder device 16 on the basis of the correlation value and the quantity of the braking operation.

As the above-described threshold value regarding the braking operation quantity, the braking operation quantity before the brake pedal 12 enters the used-up status to the time when the brake pedal 12 substantially enters the used-up status is appropriately set. For example, it is assumed that the braking operation quantity at the time when the brake pedal 12 enters substantially the used-up status is set to the threshold value.

As the correlation value of the braking operation force, a detection value of a load sensor (not shown) for detecting a load of depressing the brake pedal 12 may be adopted in addition to the primary hydraulic pressure detected by the primary hydraulic pressure sensor Pm.

According to the vehicle braking device 10 based on the first aspect, switching control is made in accordance with whether the quantity of the braking operation is smaller than the predetermined threshold value or not, between operating the motor cylinder device (secondary hydraulic pressure generating unit) 16 or the motor cylinder device 16 on the basis of the correlation value and the quantity of the braking operation.

In the vehicle braking device 10 based on the second aspect, which is based on the first aspect, the ECU 200 (control unit) performs, when the quantity of the braking operation is smaller than the predetermined threshold value, operates the motor cylinder device (secondary hydraulic pressure generating unit) 16 on the basis of the quantity of the braking operation, and on the other hand, when the quantity of the braking operation reaches the threshold value, the ECU 200 operates the motor cylinder device (secondary hydraulic pressure generating unit) 16 on the basis of the correlation value and the quantity of the braking operation.

In the first region where the operation quantity is smaller than the threshold (see FIGS. 5 and 6), there is no obstacle to calculate the target hydraulic pressure on the basis of the braking operation quantity. This is because in the first region, variation in the braking operation quantity appropriately occurs. Then, in the first region, the ECU (control unit) 200 calculates the target hydraulic pressure on the basis of the braking operation quantity.

On the other hand, in the second region (see FIGS. 5 and 6) where the braking operation quantity reaches the threshold value, there may be obstacle in calculating the target hydraulic pressure. In the second region, there is essentially no variation in the braking operation quantity. Accordingly, the ECU (control unit) 200 calculates the target hydraulic pressure on the basis of the correlation value of the braking operation force such as the primary hydraulic pressure, etc. or the target hydraulic pressure on the basis of the correlation value and the braking operation quantity and operates the motor cylinder device (secondary hydraulic pressure generating unit) 16 to cause the secondary hydraulic pressure to track the target hydraulic pressure calculated as described above.

According to the vehicle braking device 10 based on the second aspect, in the first region, the target hydraulic pressure is calculated on the basis of the braking operation quantity, and the motor cylinder device 16 is operated so that the secondary pressure tracks the target hydraulic pressure calculated as described above. On the other hand, in the second region, the vehicle braking device 10 calculates the target hydraulic pressure on the basis of the corresponding correlation value and the braking operation quantity, so that the secondary hydraulic pressure tracks the target hydraulic pressure calculated as described above. Accordingly, there is no chance where the target hydraulic pressure becomes a maximum status as long as the driver applies an extremely large braking operation force.

As described above, according to the vehicle braking device 10 based on the second aspect, like the vehicle braking device 10 based on the first aspect, it is suppressed that the brake device enters an overheat status as well as a durability of the components of the brake device can be enhanced.

Further, the vehicle braking device 10 based on the third aspect is the vehicle braking device 10 based on the third aspect in which such a configuration is adopted in which the ECU (control unit) 200 performs the switching gradually when the switching is made from the control for operating the secondary hydraulic pressure generating unit on the basis of the quantity of the braking operation to the control for operating the secondary hydraulic pressure generating unit on the basis of the quantity of the correlation value and the braking operation quantity.

According to the vehicle braking device 10 based on the third aspect, when the switching is performed from the control for operating the motor cylinder device (secondary hydraulic pressure generating unit) 16 based on the quantity of the control operation to the control for operating the motor cylinder device (secondary hydraulic pressure generating unit) 16 based on the correlation value of the braking operation force or the corresponding correlation value and a quantity of the braking operation, the switching is gradually made, so that unnatural feeling can be reduced during the switching.

Other Embodiments

A plurality of the embodiments described above show specific examples of the present invention. Accordingly, it should be avoided to interpret the technical scope of the present invention limitedly. This is because the present invention can carried out in various modes without departure from the subject matter and the main features.

For example, in the explanation of the embodiments of the present invention, as a characteristic of the first target hydraulic pressure previously stored in the first map 232, a linear characteristic has been exemplified. However, the present invention is not limited to this example. As the characteristic of the first target hydraulic pressure previously stored in the first map 232, a non-liner characteristic and a stepwise characteristic can be appropriately adopted. This is true for the second map 234.

Further, in the explanation of the embodiments of the present invention, as a characteristic of the additional value of a first target hydraulic pressure previously stored in a third map 240, the explanation has been made in which a linear characteristic is exemplified. However, the present invention is not limited to this example. As the characteristic of the additional value, other characteristics such as a non-linear characteristic and stepwise characteristic may be used.

Further, in the explanation of the distribution ratio setting unit 235 according to the embodiment of the present invention, the distribution ratio setting unit 235 has been explained with an example in which the distribution ratios RO having different values between the first region in which the control operation quantity is smaller than the threshold value and the second region in which the control operation quantity has reached the threshold. However, the present invention is not limited to this example. As the distribution ratio setting unit 235, it is also possible to adopt such a configuration that the distribution ratio RO is set on the basis of either of the control operation quantity or the control operation force or both the control operation quantity and the control operation force.

Further Embodiment

In the first embodiment, the distribution ratio setting unit 235 according to the first embodiment of the present invention sets the distribution ratios RO having different values between the first region in which the control operation quantity is smaller than the threshold value and the second region in which the control operation quantity has reached the threshold. However, the distribution ratios RO can be gradually changed. The basic structure is the same as that of the first embodiment, and thus only a different part is described.

Figure 9:
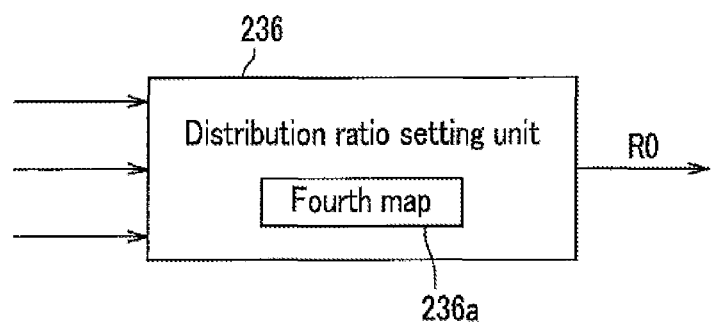
FIG. 9 is a partial block diagram of the further embodiment of the present invention.
Figure 10:
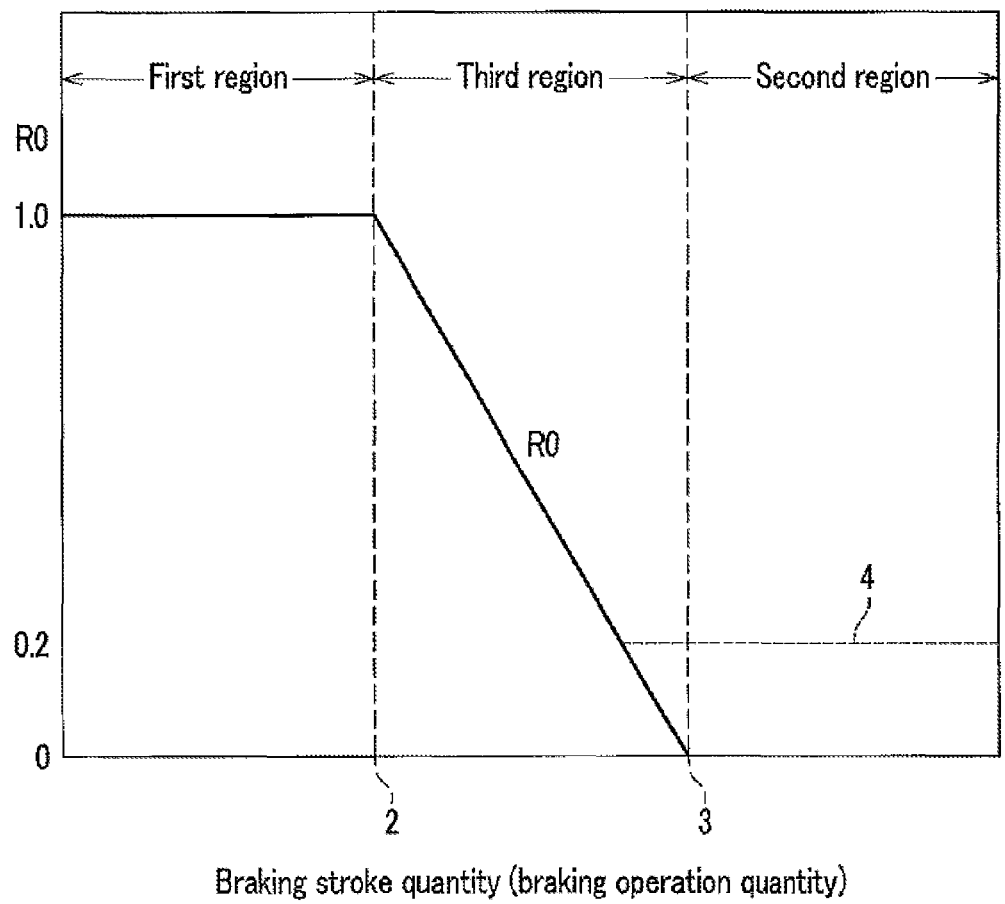
FIG. 10 is a chart showing a variation in the distribution ratio RO relative to the brake operation quantity.

FIG. 9 is a partial block diagram of the further embodiment of the present invention. FIG. 10 is a chart showing a variation in the distribution ratio RO relative to the brake operation quantity.

In the further embodiment, the distribution ratio setting unit 235 in FIG. 3 is replaced with a distribution ratio setting unit 236. The distribution ratio setting unit 236 includes a fourth map 236a. The fourth map 236a stores the following function:

The distribution ratio setting unit 236 sets, in the first region (see FIG. 10) in which the braking operation quantity is smaller than the variation start threshold value 2, such a value of the distribution ratio RO that a value of the third target hydraulic pressure is equalized to a value of the first target hydraulic pressure.

Next, in a third region in which the brake operation quantity reaches the variation start threshold value 2 (see FIG. 10), the distribution ratio RO decreases at a predetermined inclination. In a second region (see FIG. 10) in which the braking operation quantity exceeds a variation finishing threshold value 3, such a value of the distribution ratio RO that the value of the third target hydraulic pressure is equalized to a value of the second target hydraulic pressure.

Accordingly, ECU 200 performs a switching control, in accordance with whether the quantity of the brake operation detected by the braking operation quantity detecting unit is equal to or smaller than the variation start threshold value 2 or not, between causing the secondary hydraulic pressure generating unit to operate on the basis of a quantity of the brake operation and causing the secondary hydraulic pressure generating unit to operate on the basis of the correlation value of the control operation force detected by the brake operation force detecting unit or the correlation value and the quantity of the brake operation.

In addition, in FIG. 10, a broken line 4 indicates the RO which is a constant, for example, "0.2".

Accordingly, ECU 200 performs a switching control, in accordance with whether the quantity of the brake operation detected by the braking operation quantity detecting unit is equal to or smaller than the variation start threshold value 2 or not, between causing the secondary hydraulic pressure generating unit to operate on the basis of a quantity of the brake operation and causing the secondary hydraulic pressure generating unit to operate on the basis of the correlation value and the quantity of the brake operation.

As described above, there is the third control state in the third region between a first control state in the first region and a second control state in the second region. In the third control state, the distribution ratio RO is controlled to vary from the value of the distribution ratio RO in the first region to the value of the distribution ratio RO in the second region.

DESCRIPTION OF REFERENCE SYMBOLS

10 Vehicle braking device
14 Hydraulic pressure generating device (primary hydraulic pressure generating unit)
16 Motor cylinder device (secondary hydraulic pressure generating unit)
72 Electric motor (electric actuator)
200 ECU (control unit)
205 Brake pedal sensor (braking operation quantity detecting unit)
Pm Primary hydraulic pressure sensor

The invention claimed is:

1. A vehicle braking device, comprising:
a primary hydraulic pressure generating unit configured to generate a primary hydraulic pressure in accordance with a braking operation by a driver;
a braking operation quantity detecting unit which detects a quantity of the braking operation;
a control unit which determines a target hydraulic pressure based on the detected quantity of the braking operation;
a secondary hydraulic pressure generating unit which generates a secondary hydraulic pressure by operation of an electric actuator, and wherein the control unit controls the actuator such that the secondary hydraulic pressure tracks the target hydraulic pressure based on the braking operation;
a braking operation force detecting unit which detects a correlation value of a force of the braking operation, the correlation value correlating to at least one of the primary hydraulic pressure and a load of depression of a brake operating member of the vehicle, and
wherein:
the control unit also performs switching control, in accordance with whether the quantity of the braking operation detected by the braking operation quantity detecting unit is smaller than a predetermined threshold value or not, the switching control involves switching between controlling the secondary hydraulic pressure generating unit to generate the secondary hydraulic pressure based on the detected quantity of the braking operation, and controlling the secondary hydraulic pressure generating unit to generate the secondary hydraulic pressure based on the correlation value of the control operation force or on both the correlation value of the control operation force and the quantity of the braking operation; and
the predetermined threshold value is based on the braking operation quantity at the time when the brake operating member of the vehicle approaches a maximum stroke position thereof.

2. The vehicle braking device as claimed in claim 1, wherein the control unit controls the secondary hydraulic pressure generating unit to generate the secondary hydraulic pressure based on the detected quantity of the braking operation when the quantity is smaller than the predetermined threshold value and controls the secondary hydraulic pressure generating unit to generate the secondary hydraulic pressure based on the correlation value of the control operation force or on both the correlation value of the control operation force and the quantity of the braking operation when the quantity of the braking operation reaches the threshold value and above.

3. The vehicle braking device as claimed in claim 1, wherein the control unit gradually switches the switching control when the quantity of the braking operation reaches the threshold value.

4. The vehicle braking device in claim 3, wherein the control unit determines the target hydraulic pressure based on a distribution ratio of the quantity of the braking operation and the correlation value of the control operation force, gradually switches the switching control by changing a value of the distribution ratio in a region between when the detected quantity of the braking operation reaches the predetermined value and when the detected quantity of the braking operation reaches another, larger threshold.

5. The vehicle braking device in claim 1, wherein the control unit determines the target hydraulic pressure based on a distribution ratio of the quantity of the braking operation and the correlation value of the control operation force.

6. The vehicle braking device in claim 5, wherein the distribution ratio is between 0 and 1.

7. A vehicle braking device, comprising:
- a primary hydraulic pressure generating unit configured to generate a primary hydraulic pressure in accordance with a braking operation by a driver;
- a braking operation quantity detecting unit which detects a quantity of the braking operation;
- a control unit which determines a target hydraulic pressure based on the detected quantity of the braking operation;
- a secondary hydraulic pressure generating unit which generates a secondary hydraulic pressure by operation of an electric actuator, and wherein the control unit controls the actuator such that the secondary hydraulic pressure tracks the target hydraulic pressure based on the braking operation; and
- a braking operation force detecting unit which detects a correlation value of a force of the braking operation, the correlation value of the control operation force correlating to at least one of the primary hydraulic pressure and a load of depression of a brake operating member of the vehicle, wherein:
the control unit controls the secondary hydraulic pressure generating unit to generate the secondary hydraulic pressure based on the detected quantity of the braking operation when the quantity is smaller than a predetermined threshold value, and controls the secondary hydraulic pressure generating unit to generate the secondary hydraulic pressure based on the correlation value of the control operation force or both of the correlation value of the control operation force and the quantity of the braking operation when the quantity of the braking operation reaches the predetermined threshold value and above, to thereby prevent the vehicle braking device from being overheated and enhance durability of components of the vehicle brake device; and the predetermined threshold value is based on the braking operation quantity at the time when the brake operating member of the vehicle approaches a maximum stroke position thereof.

8. The vehicle braking device as claimed in claim 7, wherein the control unit gradually switches the switching control when the quantity of the braking operation reaches the threshold value.

9. The vehicle braking device in claim 8, wherein the control unit calculates the target hydraulic pressure based on a distribution ratio of the quantity of the braking operation and the correlation value of the control operation force, and gradually switches the switching control by changing a value of the distribution ratio in a region between when the detected quantity of the braking operation reaches the predetermined value and when the detected quantity of the braking operation reaches another, larger threshold.

10. The vehicle braking device in claim 9, wherein the distribution ratio is between 0 and 1.

11. The vehicle braking device in claim 7, wherein the control unit calculates the target hydraulic pressure based on a distribution ratio of the quantity of the braking operation and the correlation value of the control operation force.

* * * * *